United States Patent [19]

Tromp

[11] Patent Number: 4,799,381
[45] Date of Patent: Jan. 24, 1989

[54] VEHICLE ROAD SENSOR

[75] Inventor: Corwin M. Tromp, Muskegon, Mich.

[73] Assignee: CMI International, Inc., Southfield, Mich.

[21] Appl. No.: 155,496

[22] Filed: Feb. 21, 1988

[51] Int. Cl.$^4$ ............................ G01G 3/14; G01L 1/22
[52] U.S. Cl. ..................................... 73/146; 29/621.1; 177/211; 338/4
[58] Field of Search ............................. 73/146, 862.04; 340/365 A; 177/132, 133, 134, 135, 211; 338/4; 29/610 SG

[56] References Cited

U.S. PATENT DOCUMENTS

| | | | |
|---|---|---|---|
| 4,333,543 | 6/1982 | Pietzsch et al. | 177/211 |
| 4,616,723 | 10/1986 | Pietzsch et al. | 177/211 |
| 4,712,423 | 12/1987 | Siffert et al. | 73/146 |

*Primary Examiner*—Donald O. Woodiel

[57] ABSTRACT

A sensor used for detecting the passage of vehicles over a roadway is formed of a force sensing variable resistor which is embedded in a resilient, rubber-like strip that is molded around the resistor within an elongated sheet metal channel. The channel is sized to fit within a narrow saw-cut groove across the roadway, so that the strip exposed surface at the open top of the channel is exposed at the road surface for contact by the tires of passing vehicles. The resistor is formed of a printed circuit having a pair of separated conductive stripes with a repetitive pattern of gap areas between them, and a sheet of variable resistance material overlying each of the gap areas to form conductive shunts between the printed conductive stripes. The material forming each of the sheets normally resists the flow of electrical current, but its resistance decreases in response to physical pressure so as to become a conductor over its respective gap area in response to the direct pressure from a vehicle tire compressing the resilient strip above the sheet. A detector is used to sense the flow of current through the printed circuit for sensing the vehicle.

18 Claims, 1 Drawing Sheet

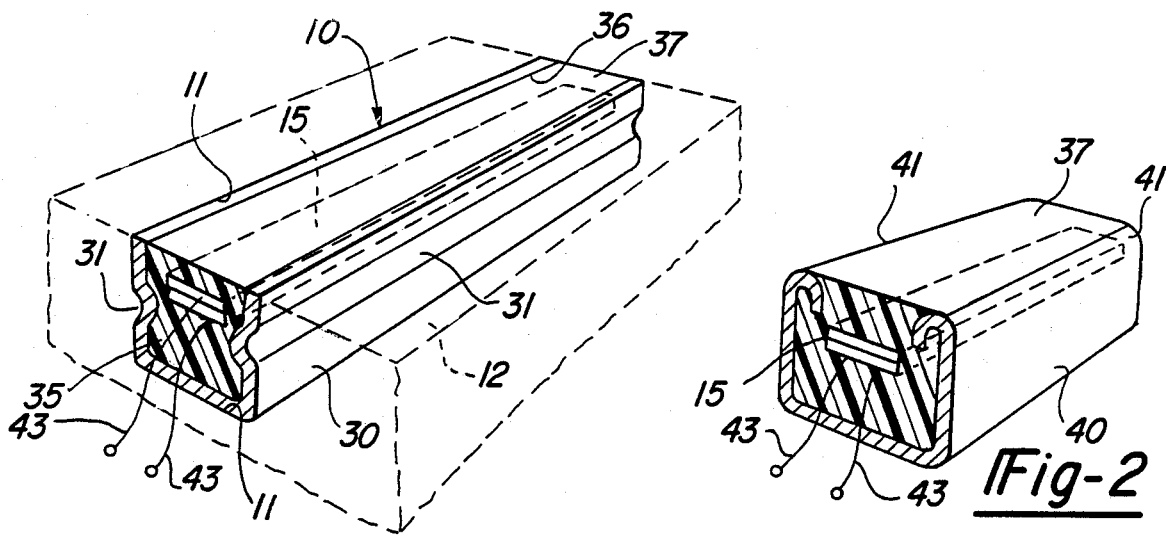
Fig-1
Fig-2
Fig-3
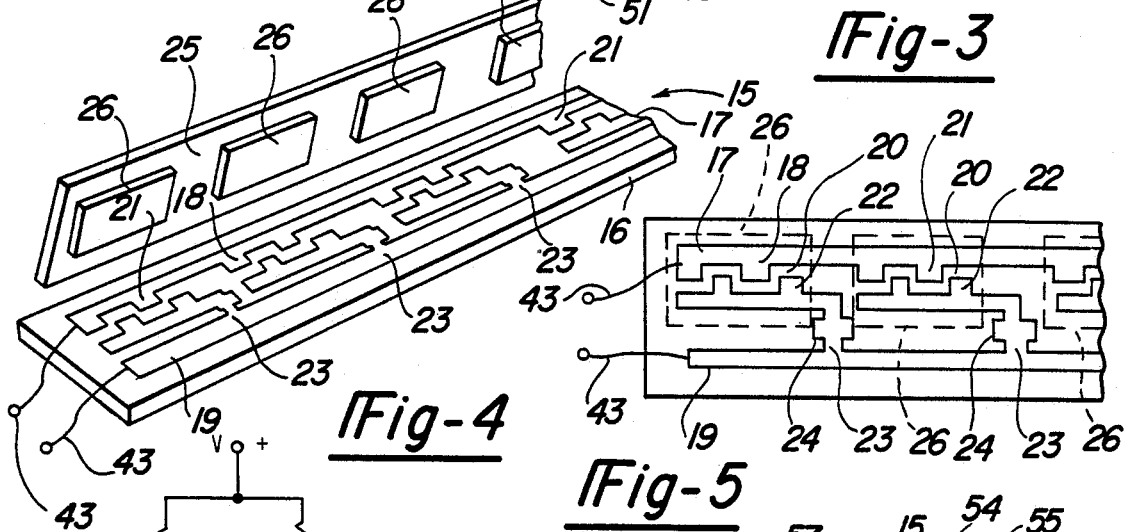
Fig-4
Fig-5
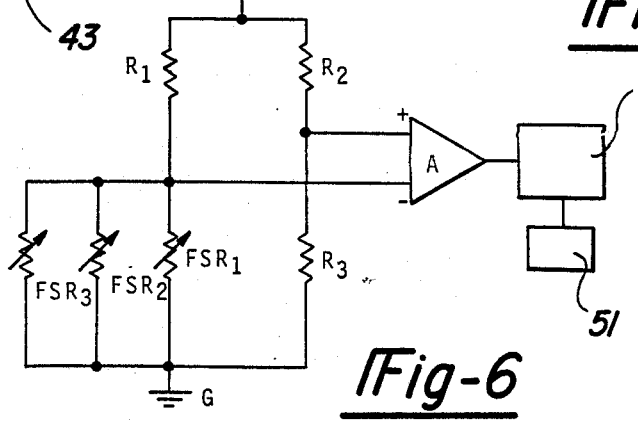
Fig-6
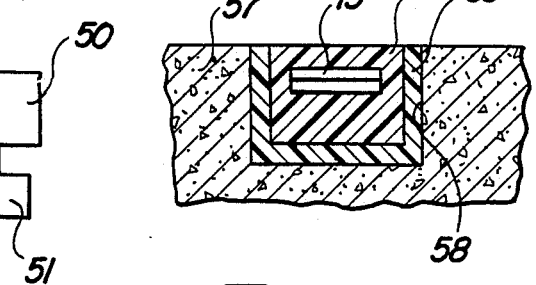
Fig-7

VEHICLE ROAD SENSOR

BACKGROUND OF INVENTION

The invention relates to a sensing device which can be applied upon the surface of a road, flush with the surface, for sensing the passage of vehicles over the device and, if connected with a properly programmed computer, determining the weight of the vehicle passing over the device.

Road sensing devices that are commonly used generally comprise an elongated tube or hose which is laid across a road so that passing vehicles run over it. Typically, the pressure of the vehicle tires causes the tube or hose to compress momentarily which affects the air pressure within the tube or hose. By use of a suitable air pressure responsive indicator, the presence of vehicles can be recorded. Such detectors are relatively easily damaged in use. In addition, they are not capable of producing sophisticated indications of location of the vehicle wheel on the road, vehicle weight indications and the like.

In addition, a cable like, piezo-type axle sensor has been used. Generally, this consists of a central, or inner conductor which is surrounded by a piezo ceramic material, in turn surrounded by an outer tubular conductor. Pressure on the cable-like sensor causes an electrical signal to flow between the conductors, which signal may be proportional to the amount of pressure. However, this sensor is prone to false signals because the round cable is susceptible to pressure from any direction, including pressure from pavement movements, heavy weights and poor truck suspension systems. Also, it functions poorly under light pressure from light vehicles and from slow speed vehicles, since piezo material is a rate of change or speed dependent material.

Recently, compression or force sensitive resistors have become available. These resistors or semi-conductors normally resist the flow of electrical current, but permit the flow in proportion to pressure applied to the resistor. That is, by squeezing or compressing the resistor, it becomes less resistant to the flow of current so that the flow of current can be measured by a suitable detector that indicates the fact of the application of pressure as well as the amount of pressure and, also, the location of the pressure upon a particular resistor. By way of an example, a force sensitive resistor may comprise an elongated, printed circuit strip having electrically conductive stripes printed upon a substrate, with a repetitive pattern of gap-like areas between the stripes. These areas may be covered by a compression responsive semi-conductor film or coating applied upon a non-conductive plastic substrate. The film or coating may be formed of conductive, metallic micron size particles contained as a matrix, within a suitable non-conductive plastic material. Upon the application of pressure to the film, the resistance to electrical flow through the film decreases or, alternatively, the amount of electrical contact between the film and the conductive stripes increases, so that the film or coating may serve as an electrical shunt across the particular gap area which it overlaps. Consequently, pressure applied upon the device results in current flow through the printed circuit across the gap area beneath the pressure. The amount of pressure and the location of the pressure along the resistor printed circuit can then be detected.

Examples of such compression sensitive devices are disclosed in U.S. Pat. No. 4,314,227 issued Feb. 2, 1982, U.S. Pat. No. 4,315,238 issued Feb. 9, 1982, U.S. Pat. No. 4,451,714 issued May 29, 1984 and U.S. Pat. No. 4,489,302. These patents disclose switch-like constructions including a film of fine particles of molybdenum disulfide which are formed into a film upon a nonconductive sheet to provide microprotrusions that are in intimate contact with separated conductive sections of a conductive material. Upon application of pressure the contact increases so that current flows through the shunt-like film. An alternative film is made of conductive particles that are loosely packed together, so that the loose mass is essentially not conductive, and which compress together under pressure to make good, conductive contact so as to shunt current between the separated conductive sections.

The foregoing type of force sensing resistor is relatively fragile and sensitive. Thus, such resistors would not ordinarily be considered suitable for use in a rugged, relatively destructive environment. However, the invention of this application is concerned with a sensing device, which utilizes a force sensing resistor, that may be used in the outdoor, highly destructive environment of a road for producing accurate, and repeatable indications of vehicle passage, vehicle weight, and the like useful information.

SUMMARY OF INVENTION

This invention contemplates forming a sensor device with a force sensing resistor, particularly of the type having an elongated, printed circuit with a pattern of spaced apart gaps between conductive stripes, and with a pressure responsive film or coating overlapping the gaps for shunting electricity over the respective gaps in response to applied pressure. The resistor is completely embedded within a block or strip of a rubbery plastic material, such as a synthetic urethane type rubber, which strips is formed to fit within a narrow groove cut within a roadway. The block may be molded within an elongated channel which stiffens and protects its sides and bottom, but leaves its upper surface exposed for vehicle contact at the road surface. Pressure of a vehicle upon the exposed upper surface of the block is transmitted to the film or coating beneath the pressurized area so as to permit the film or coating to momentarily become electrically conductive. Hence, electrical flow momentarily takes place across the particular gap area that is located beneath the applied pressure. That electrical flow can be detected with a suitable electrical measuring device, such as an ammeter or voltmeter or the like, depending upon circuit arrangements. Moreover, the detected signal can be connected to a computer to determine the location of the pressurized area affected and hence, the location of the vehicle along the length of the sensor.

An object of this invention is to provide a sturdy, unbreakable, block or elongated strip of a resilient, rubber-like material within which the force sensitive resistor is molded so that the resistor is protected against environmental damage and against impact and other damaging forces. In addition, the monolithic rubber-like block which encases the sensor is protectd and reinforced against undesirable distortion and heat caused permanent deformations. Such protection may be provided by positioning the strip within a metal channel or within a channel-like, narrow groove cut in the roadway.

Still a further object of this invention is to provide a detector which may be inserted rapidly, with almost no labor, within grooves formed in a roadway. These grooves may be arranged transversely of a road for measuring the passage of vehicles over the road, or may be arranged in a road at a particular location to indicate the presence of a vehicle at that location.

Another object of this invention is to provide a simplified vehicle detector which is relatively inexpensive in construction, installation and operation, which is essentially free of maintenance, and which is extremely resistant to environmental and use damages.

Yet another object is to provide a detector which reacts only to pressure applied from the top, that is, downwardly applied pressure. Moreover, the detector reaction is not dependent upon the speed of the vehicle passing over it.

These and other objects and advantages of this invention will become apparent upon reading the following description, of which the attached drawings form a part.

DESCRIPTION OF DRAWINGS

FIG. 1 is a perpective view of a portion of the sensor arranged within a groove formed in a roadway, which is shown in dotted lines.

FIG. 2 is a fragmentary, perspective view of a modified form of sensor channel.

FIG. 3 is a schematic, fragmentary view showing a series of resistors, arranged side by side in the surface of a roadway and connected to an indicating device.

FIG. 4 is a perspective, fragmentary view of the force sensitive resistor printed circuit section and overlapping shunt film section arranged side by side.

FIG. 5 is a fragmentary, plan view showing the printed circuit section overlapped by the shunt film portions (shown in dotted lines).

FIG. 6 is a schematic view of a simplified circuit diagram.

FIG. 7 is a cross-sectional, end view of a modified sensor arranged within a groove in a roadway surface.

DETAILED DESCRIPTION

FIG. 1 illustrates a sensor 10 arranged within a slot or saw-cut like groove 11 formed in the upper surface of a road 12. The road surface may be on a highway or the like where the number and weight of vehicles passing over the road are to be determined. Alternatively, the road may be part of the roadway around a truck weighing station or it may even be within a factory floor where the movement of vehicles or the loads upon vehicles are a matter of concern. Typically, the groove may be formed in the road using a conventional road cutting saw device.

The sensor includes a force sensing resistor system 15 having two major parts. The first part comprises a non-conductive substrate 16 upon which a printed circuit coating 17 is applied. The printed circuit has a pair of conductive stripes 18 and 19. The stripes are printed with regular, spaced apart, patterns of gap areas 20. The gap areas may be formed in various shapes which generally form separated terminals. For illustrative purposes, the gap areas are illustrated as comprising teeth-like portions 21 on the stripe 18 meshed with teeth-like portions 22 on the opposite stripe 19. The teeth portion 22 has a connection lead 23 that is integral with the stripe 19 and which includes a printed resistor 24. (See FIG. 5.)

The second major part of the force sensing resistor system is a plastic substrate 25, such as made of "Mylar" or some other thin, flexible plastic sheet material, upon which is formed a film or coating or sheet-like deposit 26. This film is formed of a semi-conductive material, such as molybdenum disulfide particles that are micron and submicron in size. The film normally does not conduct electrical current. However, under pressure, the film will conduct electrical current across the gap areas which it covers. The amount of current it will conduct, that is, its resistance to electrical flow, is proportional to the amount of pressure applied to it.

As mentioned, the film 26 may be formed of electrically conductive particles, such as metal particles or molybdenum sulfide particles, which are mixed within a non-conductive material which adheres to the substrate and binds the conductive particles together. One type of film is placed in light contact with the conductive stripes and the amount of its contact with increase when the film is compressed against the stripes. Another type of film is made of particles which can be squeezed together under compression to conduct current. Films of these types are commercially available. In general, they provide uniform resistance to current flow that changes in proportion to the amount of pressure applied to the film.

One example of a suitable film available for this purpose is the force sensing resistor manufacture by Interlink Electronics, Inc. of Santa Barbara, Calif. The force sensing resistor material may vary in its electrical properties and therefore, the particular film selected depends upon the cost, availability, and desired electrical properties for the particular sensing device.

The force sensing resistor printed substrate 16 and the film carrying substrate 25 are aligned, as illustrated in FIG. 4 and then placed together, with the substrate 25 on top, as illustrated in dotted lines in FIG. 5. The resistor system is then positioned within a sheet metal channel 30, which may be provided with bent rib-like indentations 31. The channel is filled with a resilient, rubber-like material, such as a rubbery urethane material, which solidifies to form a body or resilient strip 35. The channel functions as a mold for forming the body or strip which completely surrounds and seals the force sensing resistor system.

The channel provides a structural integrity to the sensor so that it cannot be permanently deformed or flattened, such as by exposure to heat or excessive pressure which might destroy its shape. The channel is usually arranged so that its open, upper end 36 provides access to the upper, contact surface 37 of the resilient strip.

In addition to the bonding between the resilient strip and the channel, the rib indentations 31 on the channel mechanically interlock them together and, also, reinforce the channel. As an alternative construction, illustrated in FIG. 2, the channel may have its upper, free edges of its legs turned inwardly to form bent upper flanges 40. The alternative form of channel 40, shown in FIG. 2, may also have rib indentations 31 as shown in the channel of FIG. 1.

As can be seen in FIGS. 1 and 2, the force sensing resistor system is completely embedded within the resilient strip 35 near the upper, exposed contact surface 37. However, lead wires 43 are extended outwardly of the resilient strip. These lead wires are attached to each of the stripes 18 and 19 for the conduct of electricity.

When pressure is applied to the contact surface 37 of the sensor, the electrical resistance of the film or coating 26 is reduced to the point where current will flow through it so that it may shunt current across the meshed teeth 21 and 22 and through the stripes 18 and 19. For this purpose, an electrical potential is normally applied across the leads 43. For the purposes of this sensor, the potential may be very low, such as on the order of 5 to 15 volts with a low current flow.

FIG. 3 illustrates an arrangement wherein a number of sensors are arranged side by side, each connected by a lead wire to the electrical circuit system which will be described below. In this instance, a vehicle tire, illustrated schematically by the dotted lines 44, will cover several of the sensors and also, several of the resistor gap areas. Thus, the pressure of the tire will cause several of the gap areas to be shunted around simultaneously. By properly sensing the number and location of the shunted gap areas, as well as the number of sensors covered by the tire, the tire load upon the road may be determined. That is, the pounds per square inch applied to the road by the tire can be determined and used for truck weighing purposes or for obtaining information needed for determining road surface loads applied by passing vehicles.

ELECTRICAL CIRCUIT SYSTEM

The electrical circuit system may vary considerably and therefore, a schematic circuit is shown in FIG. 6 as a highly simplified example. In actual use, a more complete circuit, with appropriate readouts, indicators and the like would be used. However, as this forms no part of the invention, the simplified circuit is shown in order to explain the operation. Those skilled in the art can readily select appropriate, commercially available electrical components and circuits to perform the function.

FIG. 6 illustrates a series of three sensors, identified by the terms $FSR_1$, $FSR_2$ and $FSR_3$. These sensors are connected into the circuit which has a low voltage input V and a ground G with voltage divider resistors, schematically illustrated as $R_1$, $R_2$ and $R_3$. The circuit is connected to a conventional operational amplifier A which in turn is connected to a data processing system.

The data processing system may include a computer 50 connected to a readout device 51, such as a printer or screen, etc. The computer may be programmed to simply pick up the signals caused by the electrical flow through the printed circuit stripes 18 and 19 when the relevant portions of the film 26 are compressed to become electrically conductive. In that instance, the signal can be read through the signaling device 51 to determine or to record the passage of a vehicle over the sensor. Alternatively, the position of the applied pressure, i.e., the location of the tire upon the sensor, can be determined. For this purpose, the resistors 24 which interconnect the teeth 22 to the stripes 19, can be selected so as to each give a different signal, i.e., by changing the current flow to a predetermined characteristic amount, so that the particular gap areas affected by any particular contact with the sensor can be determined. Thus, the computer will, if properly programmed, show not only the fact that a vehicle is rolling over the sensor, but also the location of the vehicle along the length of the sensor and, in addition, can indicate the weight or amount of pressure applied. That is, the amount of electrical flow or the decrease in resistance to electrical flow, will be measurably proportional to the amount of pressure applied to the force sensing resistance film.

In operating the sensor, the readout can be in the form either of a screen visible or printed series of numbers or graphics which indicate vehicle passage, the location of the vehicle along the sensor, the pressure applied by the vehicle, the unit pressure applied (where a number of sensors are used together as illustrated in FIG. 3), etc. In addition, the sensor can be used as a control for operating other devices, such as light signals, stop and go signals of various kinds, etc. Because of its complete encapsulation within the mass of the resilient material, the resistor system is impervious to the atmosphere and to destructive environmental conditions which are found on roadways. For example, commonly applied snow melting salts, acidic rain, debris, road tar, oil and gas and the like will not affect the resistor system because it is totally protected by the thick resilient coating. The cross-sectional shape and the resiliency of the coating transmits vehicle pressure downwardly, substantially unidirectionally, to produce the sensing effect.

While the block or strip 35 enveloping the resistor system is contemplated as being molded within the protective metal channel, which will maintain the cross-sectional structure and shape of the strip, the strip may be used without a metal channel. FIG. 7 illustrates a strip 54 extruded around the resistor system 15 to form a long, flexible member. This member is inserted in a narrow groove 56 which may be saw-cut in a roadway 57. The member is held in the groove by a thick layer 58 of an epoxy resin or similar adhesive or a suitable grout material. Thus, the walls of the groove and the layer function like a channel to reinforce and support the strip and to maintain the cross-sectional shape of the strip.

Having fully described an operative embodiment of this invention, I now claim:

1. A vehicle road sensor for signaling the passage of a vehicle over a predetermined location on a roadway, comprising:

a force sensing resistor formed of a pair of overlapped non-conductive substrates, each having a controllable conductive coating, with the coatings being overlapped in adjacent surface to surface relationship;

at least one of said coatings being formed of a force responsive material characterized by normally resisting the passage of electrical current therethrough, but whose resistance decreases upon the application of pressure upon the coating;

and the second of said coatings having at least one area which precludes the passage of electrical current therethrough, and with said area being overlapped by a portion of the one coating so that said portion functions to shunt current across said area upon the application of pressure to said portion;

said substrates being completely embedded within a block formed of a resilient, rubber-like material;

said block having an upper, contact surface, with the substrates being embedded within the block beneath the contact surface so that vehicle pressure upon the contact surface is transmitted to the substrates;

means for normally applying an electrical potential to the second coating sufficient to induce the flow of current therethrough when the applied pressure reduces the electrical resistance of said portion;

means for detecting the flow of current through the second coating;

and the block forming material between the block contact surface and the substrates being resiliently compressible under the weight of a vehicle for temporarily applying enough pressure to the portion of the one coating so that it temporarily functions as a shunt across the area which it overlaps so that electrical current temporarily flows through the second coating for indicating the temporary presence of a vehicle upon the block contact surface.

2. A vehicle road sensor as defined in claim 1, and said second coating being in the form of a repetitive printed circuit pattern formed of adjacent strips which are normally electrically conductive, but which are separated by a series of gaps which form a series of areas that preclude the passage of electrical current between the strips;

and with each of said areas being overlapped by a separate portion of said first coating, so that the application of pressure to any one of said portions shunts the flow of current across the gap area which it overlaps to permit current to flow through the adjacent conductive strips for detection by said detection means.

3. A vehicle road sensor as defined in claim 2, and said block being formed in the shape of an elongated, narrow, generally uniform cross-section, with the resistor extending across a substantial portion of the length of the elongated block.

4. A vehicle road sensor as defined in claim 2, and said block being closely fitted within elongated, sheet metal, open top channel which exposes the contact surface of the block, but covers, in face to face contact, the side and lower surfaces which define the elongated block.

5. A vehicle road sensor as defined in claim 4, and said channel being sufficiently narrow to closely fit within a relatively narrow saw-cut like groove made in the surface of a road, which groove is of a depth to expose only the upper contact surface of the block;

and the channel being formed with means for interlocking at least one of the walls defining the channel with the adjacent block surface which it overlaps.

6. A vehicle road sensor as defined in claim 5, and said channel having inwardly bent ribs formed in its side walls and extending the length of the channel, with the ribs being mechanically interlocked with their adjacent block sections along the length of the channel.

7. A vehicle road sensor as defined in claim 5, and the free edges of the side walls defining the channel being bent inwardly and towards the base of the channel to form flanges, and with said flanges being embedded in their adjacent block surfaces.

8. A vehicle road sensor as defined in claim 2, and including a number of said resistors arranged side by side and offset relative to each other, for forming a single wide sensor made of a number of spaced apart resistors for detecting the width and the length of the road contacting area of the vehicle tires which pass over the sensor.

9. A vehicle road sensor as defined in claim 2, and including a secondary resistor formed in the circuit pattern between each of the areas and the strips, which secondary resistors are formed to provide a detectable effect upon the flow of electrical current so as to enable determination of the number and location of the areas that are shunted across by passage of the tires of a vehicle over the sensor.

10. A vehicle road sensor as defined in claim 2, and said block being arranged within a substantially uniform cross-section, saw-cut like groove formed in the surface of a road, with the groove being of a depth about equal to the height of the block for exposing the upper surface of the block at the road surface.

11. A vehicle road sensor as defined in claim 10, and including an adhesive material applied within the groove for immovably securing the block within the groove.

12. A vehicle road sensor for signaling the passage of a vehicle over a predetermined location on a roadway, comprising:

a force sensing resistor formed of an elongated circuit pattern printed upon a substrate, with the pattern including a pair of separated, conductive printed strips and a series of gap areas formed between the strips, with the strips being arranged for normal connection to a source of electrical power;

said force sensing resistor including a pressure responsive sheet portion overlapping each gap area, and the sheet being formed of a material characterized by being normally electrically resistant so that it is substantially non-conductive, but whose resistance to electrical flow reduces, in general proportion to pressure applied to the material, with each sheet portion forming an electrical shunt over its overlapping gap area upon the application of sufficient pressure upon the sheet portion;

said force sensing resistor being embedded within an elongated, relatively narrow block made of a resilient, rubber-like material;

the block being of a cross-sectional size to closely fit within a saw-cut made in a roadway surface so that the wheels of a vehicle running over the block apply sufficient pressure upon the block to compress it and thereby, apply sufficient pressure to those sheet portions which are located beneath the tires, to reduce their resistance and permit electrical current to flow across the gap areas which they overlap and through the strips for detection by a detection means.

13. A vehicle road sensor as defined in claim 12, and said block being closely fitted within an open top, sheet metal channel which extends and embraces substantially the full length of the block;

means holding the block within the channel so that the block upper surface is exposed through the open top of the channel, wherein the tires of a vehicle will compress the block downwardly to apply said pressure.

14. A vehicle road sensor as defined in claim 13, and including portions of the walls of the channel being bent inwardly for embedding in their adjacent block surfaces for mechanically interlocking the channel and block.

15. A method for making a vehicle road sensor comprising essentially the steps of:

preparing a force sensing resistor from an elongated, narrow substrate having a printed repetitive circuit pattern including elongated electrically conductive strips separated by defined gap areas, with a shunt sheet portion arranged over each of the gap areas, said shunt portions being made of a material characterized by normally resisting the flow of electrical current, but whose resistance decreases upon the application of pressure upon the sheet to permit electrical current flow therethrough;

molding a resilient, rubber-like material around the prepared resistor to embed the resistor within an elongated, relatively narrow strip of a width for fitting within a groove formed in a roadway.

16. A method for making a vehicle road sensor as defined in claim 15, and including the step of arranging the resistor within an elongated, open top, sheet metal channel, and molding the rubber-like material in the channel, so that the channel forms a mold, as well as the exterior of the finished sensor.

17. A method for making a vehicle road sensor comprising essentially the steps of:

forming a force sensing resistor from an elongated substrate having a printed, repetitive circuit pattern which includes elongated, electrically conductive strips that are separated by defined gap areas, with a shunt sheet portion arranged over each of the gap areas, and said sheet portions being made of a material characterized by normally resisting the flow of electrical current, but whose resistance decreases upon the application of pressure upon the sheet for permitting passage of electrical current therethrough;

molding a resilient, rubber-like material around the formed resistor so that the resistor is embedded within the rubber-like material;

forming electrical connections between the embedded strips and the exterior of the molded rubber-like material for use in connection to a source of electrical power.

18. A method for making a vehicle road sensor as defined in claim 17, and including providing a hollow, casing, and positioning the resistor within the casing and thereafter, molding the rubber-like material within the casing and around the resistor for bonding the material to the casing.

* * * * *